United States Patent
Gillard et al.

(10) Patent No.: US 12,285,928 B2
(45) Date of Patent: Apr. 29, 2025

(54) ENAMELED GLAZING

(71) Applicant: AGC GLASS EUROPE, Louvain-la-Neuve (BE)

(72) Inventors: Quentin Gillard, Huy (BE); Laura Ouidade Ouanaim, Marcinelle (BE); Nerio Lucca, Fleurus (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 195 days.

(21) Appl. No.: 17/787,266

(22) PCT Filed: Dec. 16, 2020

(86) PCT No.: PCT/EP2020/086586
§ 371 (c)(1),
(2) Date: Jun. 17, 2022

(87) PCT Pub. No.: WO2021/122856
PCT Pub. Date: Jun. 24, 2021

(65) Prior Publication Data
US 2023/0070792 A1    Mar. 9, 2023

(30) Foreign Application Priority Data

Dec. 20, 2019 (EP) ..................... 19218853
Apr. 2, 2020 (EP) ..................... 20167684

(51) Int. Cl.
*C03C 8/14* (2006.01)
*B32B 17/10* (2006.01)
*C03C 17/36* (2006.01)

(52) U.S. Cl.
CPC .. *B32B 17/10036* (2013.01); *B32B 17/10091* (2013.01); *B32B 17/10201* (2013.01); *B32B 17/1022* (2013.01); *B32B 17/1055* (2013.01); *C03C 8/14* (2013.01); *C03C 17/3644* (2013.01); *C03C 17/3673* (2013.01); *C03C 17/3681* (2013.01); *B32B 2250/02* (2013.01); *B32B 2255/205* (2013.01); *B32B 2255/28* (2013.01); *B32B 2307/202* (2013.01); *B32B 2307/204* (2013.01); *B32B 2307/416* (2013.01); *B32B 2311/02* (2013.01); *B32B 2311/20* (2013.01); *B32B 2315/08* (2013.01); *B32B 2398/20* (2013.01)

(58) Field of Classification Search
CPC ... C03C 8/14; C03C 17/3644; C03C 17/3673; C03C 17/3681
See application file for complete search history.

(56) References Cited

U.S. PATENT DOCUMENTS

| | | | |
|---|---|---|---|
| 5,714,420 A | 2/1998 | Sakoske et al. | |
| 5,968,659 A | 10/1999 | Sakoske et al. | |
| 6,105,394 A | 8/2000 | Sridharan et al. | |
| 6,207,285 B1 | 3/2001 | Sakoske et al. | |
| 6,255,239 B1 | 7/2001 | Sakoske | |
| 2004/0086652 A1 | 5/2004 | Degand | |
| 2014/0017472 A1* | 1/2014 | Coster | B32B 17/10348 428/220 |
| 2017/0263894 A1 | 9/2017 | Lee et al. | |
| 2020/0392037 A1 | 12/2020 | Jamart | |

FOREIGN PATENT DOCUMENTS

| | | | | |
|---|---|---|---|---|
| EP | 0 782 974 A1 | 7/1997 | | |
| EP | 0 955 274 A1 | 11/1999 | | |
| WO | WO-2019030469 A1 * | 2/2019 | | C03C 1/04 |
| WO | WO 2019/106264 A1 | 6/2019 | | |

OTHER PUBLICATIONS

International Search Report issued Mar. 24, 2021 in PCT/EP2020/086586 filed on Dec. 16, 2020, 4 pages.

* cited by examiner

*Primary Examiner* — Michael P Wieczorek
(74) *Attorney, Agent, or Firm* — Oblon, McClelland, Maier & Neustadt, L.L.P.

(57) ABSTRACT

A method to provide for an enameled glazing including, a glass sheet, an enamel coating on at least a part of a first surface of the glass sheet, a multilayer coating on at least a part of a first surface of the glass sheet and at least partially on top of the enamel coating, such that the enamel coating either comprises no $Bi_4Si_3O_{12}$, or, if it comprises $Bi_4Si_3O_{12}$, the enamel coating exhibits a crystallinity ratio <5, as measured by XRD, where the crystallinity ratio is the ratio of $Bi_4Si_3O_{12}/Cr_2CuO_4$.

17 Claims, No Drawings

ENAMELED GLAZING

FIELD OF THE INVENTION

The present invention relates to a method to provide for an enameled glazing, to said enameled glazing and uses of said glazing.

BACKGROUND OF THE INVENTION

Typical enamel coating compositions may be applied on glass substrates, on glazing for automobile or architectural applications, to form decorative layers, conductive layers or masking layers.

In architectural applications, enamel coating compositions may be used for decorative purposes such as in paints, or masking purposes, such as in fridge doors.

In automobile windows, such as windshields, side windows and rear windows, and in fridge or oven doors, these enamels mostly serve to provide for an opaque peripheral band of dark color. The band may serve to ensure integrity of the adhesive lying under the glazing when it is mounted in the body opening by bonding, forming a screen against solar radiation, including ultraviolet radiation.

Further, in automobile windows, the enamel coatings may also serve to mask the electrical and other connection components located in the periphery of the internal side of the glazing and so improve the external appearance of the vehicle.

Typical windshields may be provided with a multilayer coating stack on at least one surface of the laminated glazing unit. When the multilayer coating comprises at least one layer of electrically conductive material, there may be some incompatibility between the enamel coating and the multilayer coating, resulting in a deteriorated multilayer coating and/or in a deteriorated enamel coating. When the quality of the multilayer coating is altered, its sheet resistance may be altered. In case of heating windshields or other heating vehicle windows, that is, when the conductive coating is provided for an active use, an altered sheet resistance may imply an altered heating functionality such as hot spots, non-uniform heating, which is not acceptable. When the quality of the multilayer coating is altered, its color may also be altered, together with its antireflective properties. An altered color or altered antireflective properties, when the conductive coating is provided for a passive use or an active use, is also not acceptable in terms of quality of comfort and solar control efficiency.

Beyond compatibility issues, a problem also arises when elements from the enamel coating diffuse out of the enamel coating into the multilayer coating, and damage said multilayer coating. Such damage may be observed with regard to color and/or sheet resistance, both of which render the end product inappropriate for its end use.

Other damages may be observed when inorganic crystals grow within the enamel coating and beyond, and as such, damage the multilayer coating in contact with the enamel coating.

Previous work attempted to overcome the issue of compatibility of an enamel coating disposed on the surface and in contact with multilayer stack providing for solar control (EP2488462) by providing for a protective top layer based on titanium oxide, niobium oxide, tantalum oxide or mixtures of these, where the titanium oxide is combined with at least one metallic oxide of the group comprising Ta, Nb, Al, Zr, Hf, V, Mn, Fe, Co, Ni, Cu, Si, Cr.

U.S. Pat. No. 5,414,240 teaches an electrically heatable laminated transparency with a hidden bus bar configuration. An electro conductive coating is applied to the transparency to interconnect the bus bar's. The coating covers the inner surface of the transparency, the bus bars, and the intermediate portion of the ceramic material border so that electric current flowing between the bus bars must flow through the portion of the coating that covers the intermediate portion of the border. Any increase in the measured surface resistance of the coating over the intermediate portion, when compared to the coating's surface resistance on the transparency surface, is maintained at a level equal to or less than about 50% of the coating's surface resistance measured on the transparency surface. In one particular embodiment of the invention, the border material is an enamel that is heated and bonded to the surface of the transparency under temperatures and time-at-temperature conditions that do not adversely affect the optical properties of the transparency while providing a surface smoothness that will maintain any increase in the coating's surface resistance over the border material within these acceptable limits. The enamel also resists discoloration resulting from staining by the silver in the bus bars.

U.S. Pat. No. 10,455,645 relates to a laminated motor vehicle glass panel which consists of two glass sheets joined by means of an intermediate sheet, the glass panel comprising a system of heated layers which is applied to one of the sheets and, to the edge of the same sheet, a substantially opaque masking strip, in contact with the glass sheet, the system of heated conductive layers at least partially covering the masking strip. The glass panel further comprises power supply busbars in contact with the system of layers in the portion covering the masking strip, characterized in that the masking strip has a roughness no greater than 0.5µ and preferably no greater than 0.1µ.

There is however still a need for an enameled glazing wherein the enamel coating remains compatible with a multilayer coating with regard to aesthetics and/or electro conductive performances.

SUMMARY OF THE INVENTION

The present invention provides for a method to provide for an enameled glazing comprising, in sequence, at least the steps of
1) providing for a glass sheet,
2) depositing an enamel coating composition comprising at least bismuth oxide, silicon oxide, and $Cr_2CuO_4$, on at least a part of the glass sheet,
3) firing the enamel coating on the glazing at a temperature of from 500 to 680°, to form a fired enamel coating on the glass sheet,
4) depositing a multilayer coating on the glazing and on at least a part of the fired enamel coating on the glazing to form a coated glass sheet,
5) thermally treating the coated glass sheet at a temperature of from 550 to 700° C., to form the enameled glazing comprising an enamel coating and a multilayer coating, characterized in that the enamel coating either comprises no $Bi_4Si_3O_{12}$, or,
if it comprises $Bi_4Si_3O_{12}$, the enamel coating exhibits a crystallinity ratio <5, as measured by XRD, wherein the crystallinity ratio is the ratio of $Bi_4Si_3O_{12}/Cr_2CuO_4$.

Also provided is an enameled glazing comprising at least a glass sheet, a multilayer coating, and an enamel coating, wherein, in presence of $Bi_4Si_3O_{12}$, the enamel coating exhibits a crystallinity ratio <5, wherein the crystallinity ratio is the ratio of $Bi_4Si_3O_{12}/Cr_2CuO_4$, as measured by XRD, and a laminated glazing comprising at least one of the present enameled glazing.

Last provided is the use of the present enameled glazing as a heatable vehicle glazing, or heatable window.

In the scope of the present invention, the terms "below", "underneath", "under" indicate the relative position of a layer vis a vis a next layer, within the layer sequence starting from the substrate. In the scope of the present invention, the terms "above", "upper", "on top", "on" indicate the relative position of a layer vis a vis a next layer, within the layer sequence starting from the substrate.

In the scope of the present invention, the relative positions of the layers within the multilayer coating do not necessarily imply direct contact. That is, some intermediate layer may be provided between the first and second layer. In some instances, a layer may actually be composed of several multiple individual layers (or sublayers).

In some instances, the relative position may imply direct contact, and will be specified.

DETAILED DESCRIPTION OF THE INVENTION

The present invention provides for a method to provide for an enameled glazing comprising, in sequence, at least the steps of
1) providing for a glass sheet,
2) depositing an enamel coating composition comprising at least bismuth oxide, silicon oxide, and $Cr_2CuO_4$, on at least a part of the glass sheet,
3) firing the enamel coating on the glazing at a temperature of from 500 to 680°, to form a fired enamel coating on the glass sheet,
4) depositing a multilayer coating on the glazing and on at least a part of the fired enamel coating on the glazing to form a coated glass sheet,
5) thermally treating the coated glass sheet at a temperature of from 550 to 700° C., to form the enameled glazing comprising an enamel coating and a multilayer coating, characterized in that the enamel coating either comprises no $Bi_4Si_3O_{12}$, or, if it comprises $Bi_4Si_3O_{12}$, the enamel coating exhibits a crystallinity ratio <5, as measured by XRD, wherein the crystallinity ratio is the ratio of $Bi_4Si_3O_{12}/Cr_2CuO_4$.

The glass sheet useful in the scope of the present invention may be any suitable glass substrate useful in the field of transportation applications. Transportation applications include automotive vehicle applications, as well as various other transportation vehicles such as, boats, trains, aircraft, spacecraft and space stations.

The glass may be a glass of soda-lime-silica, alumino-silicate or borosilicate type, and the like. Typically, the glass is float glass, having a thickness of from 1 to 8 mm. The composition of the glass is not crucial for the purpose of the present invention, provided said glass is appropriate for vehicle windows. The glass may be clear glass, ultra-clear glass or colored glass, comprising one or more component (s)/colorant(s) in an appropriate amount as a function of the effect desired.

The glass sheet may be flat or totally or partially curved to correctly fit with the particular design of the glass support, as the shape required for vehicle or a building. The glass sheet may be tempered.

Typical enamel compositions comprise a glass frit, pigments and other additives in a medium. Additives include adhesion promoters, crystalline seed materials, reducing agents, conductive metals (e.g. silver particles), rheological modifiers, flow aids, adhesion promoters, stabilizers, etc.

Glass frit may comprise oxides of silicon, niobium, sodium, boron, zinc, bismuth, titanium, molybdenum, zirconium, yttrium, aluminium, lithium, potassium in varying amounts, depending on the qualities of enamel sought.

The various oxides may provide for various functions to the enamel coating, such as network formation, flux component, chemical resistance, melting point modifiers, firing temperature modifiers, chemical durability improvers, migration blockers, gloss suppressors, water proofing agents, among others. Typically, the oxides will be used in specific and known amounts to provide for the expected properties, as will be known by the skilled person.

Examples of crystalline seed materials composing the base of a glass frit include zinc borates, zinc silicates, zinc titanates, bismuth silicates, aluminum silicates and mixtures thereof. The glass frits may thus be zinc based, bismuth based, bismuth free frit, or else.

A glass frit may be formed by blending and melting the materials at a temperature of from 950 to 1350° C. for 30 to 60 minutes to form a molten glass of given composition. The molten glass may then subsequently be cooled by any suitable technique, to form a frit, which may then be ground to fine particles of from 1 to 8 μm.

Pigments include metal oxides, such as chromium, cobalt, copper, nickel, manganese and iron oxides. Pigments further include inorganic pigments such as olivine, priderite, borate, pyrochlore, sphene, hematite, among others.

The present bismuth based enamel compositions may comprise of from 10 to 55 wt % of bismuth oxide, of from 0.5 to 30 wt % silicon oxide, of from 0.01 to 25 wt % chromium oxide, of from 0.1 to 25 wt % copper oxide, of from 0.1 to 15 wt % iron oxide, 0.01 to 3 wt % manganese oxide, and minor elements such as sodium oxide, calcium oxide, tin oxide, zirconium oxide, lithium oxide, magnesium oxide, titanium oxide, fluor, potassium oxide, zinc oxide, barium oxide, cerium oxide, nickel oxide, phosphorus oxide, molybdenum oxide, among others, for a total of 100% inorganic content.

The $Bi_4Si_3O_{12}$, or bismuth silicate or eulytite, known as a crystal, may be present as seed material in a so-called anti-stick enamel in an amount ranging of from 0.5-60.0% wt initially present in the enamel composition. Such crystals break adhesion bonds, such that the enamel coating does not remain sticky on machine parts and on other glass sheets or devices during processing.

In the scope of the present invention, the enamel coating is not initially intended to serve as anti-stick, and as such $Bi_4Si_3O_{12}$ is not initially present in amounts >5 wt %, alternatively not in amounts >1 wt % in the enamel coating composition. In some instances, the $Bi_4Si_3O_{12}$, may be absent from the initial enamel composition.

However, the initially present bismuth oxide ($Bi_2O_3$) and silicon oxide ($SiO_2$) particles may provide for various forms of bismuth silicates or bismuth silicate oxides, such as $Bi_4Si_3O_{12}$ (bismuth silicate), $Bi_2SiO_5$ (bismuth silicate) or $Bi_{12}SiO_{12}$ (bismuth silicate oxide), under firing and thermal treatments. These crystals may appear in the course of the process, while not necessarily being initially present in the enamel composition/frit. In such instances, such crystals do not provide for any particular function, and are present upon spontaneous formation from the elements of the frit composition and assemble during the steps of the procedure involving heating. The alternative forms of bismuth oxide and bismuth silicate oxide are not taken into account in the present crystallinity ratio, where only $Bi_4Si_3O_{12}$ is considered.

The modulation of silicate oxides formation may be provided by specific crystallization inhibitor present, and/or intentionally added, in the composition.

In the scope of the present invention, the selected process temperatures as defined above together will allow for a limitation of the formation of $Bi_4Si_3O_{12}$ from the originally present $Bi_2O_3$ and $SiO_2$ particles. Preferably, the $Bi_4Si_3O_{12}$ is not generated at all, and its presence in the final enameled glazing is only provided by its presence in the initial enamel composition, in an amount ≤5.0 wt %, alternatively in an amount ≤2.0 wt %, alternatively in an amount ≤1.0 wt %, alternatively in an amount ≤0.5 wt %.

The appropriate choice of enamel composition coupled with the selected process temperatures as defined above will allow for either, the absence of $Bi_4Si_3O_{12}$, or, in the limitation of the amount of $Bi_4Si_3O_{12}$ generated and thus for a crystallinity ratio <5.

The $Cr_2CuO_4$, or copper chromium black spinel, is typically known as a pigment, and is widely present in enamel compositions and coatings serving as masking enamels, for its contribution to a final black color of the enamel coating.

When the enamel coating in the enameled glazing comprises $Bi_4Si_3O_{12}$ in addition to the at least bismuth oxide, silicon oxide, and $Cr_2CuO_4$ after both the firing of step (3) and the thermal treatment of step (5) of the process described hereafter, said enamel coating in the enameled glazing exhibits a crystallinity ratio <5, wherein the crystallinity ratio is the ratio of $Bi_4Si_3O_{12}/Cr_2CuO_4$, as measured by XRD, alternatively a crystallinity ratio <2, alternatively a crystallinity ratio <1, alternatively a crystallinity ratio <0.05, alternatively a crystallinity ratio <0.01.

A medium ensures all particles and components are in proper suspension or in the form of a paste, and allows for the initial adhesion of the composition to the glass onto which the composition is applied. The medium may include organic solvents such as mineral oils, vegetable oils, terpenes, diluents, synthetic and natural resins (such as acrylic, acrylamide, melamine, vinyl-acrylic, (poly)urethane, polyester), water based resins, UV-crosslinkable components, water, surfactants and mixtures thereof. The medium will typically be present in the enamel paste composition in amounts of from 15 to 40 wt %, while the solids may be present in amounts of from 60 to 85 wt %.

In other instances, the enamel paste composition may have an inorganic content of from 30 to 80 wt % and an organic content of from 5 to 40 wt %.

The enamel coating composition may be prepared by providing for all solid components and mixing these in the medium, to form the enamel paste. The composition is typically characterized by its viscosity, or its fluidity, such that there is a compromise between ease of deposition and primary adhesion. Viscosity may range of from 5,000 to 50,000 mPa·s at 20° C., as determined on a Brookfield viscometer, spindle 6 at 50 rpm.

Once the enamel paste is prepared, it may be applied on the glazing by screen printing, roller coating, spraying, curtain coating, decal application, or the like, optionally in presence of masking or shape/shadow defining elements.

The enamel coating composition is applied on at least one surface of the glass sheet. Typically, the enamel coating is applied on and in direct contact with said surface of the glass sheet. The enamel coating is typically applied on a portion of the surface of a glass sheet, for example in the periphery, that is, at a maximum of 25 cm from the outer edge of the glazing, or in segmented portions, as required by the final use and the final design of the enameled glazing and of the vehicle. The terms "enamel coating" or "enamel layer" may be used herein interchangeably, to qualify the enamel coating before application, after application but before firing, or after application after firing.

The area of the glass sheet on which the enamel coating is deposited may depend on the final use of the enameled glazing. In most instances, the surface of the glass sheet covered by the enamel coating may range of from 0.5 to 25%, alternatively 0.5 to 10%, of the surface of the glass sheet, for example in automotive or transportation applications. In some instances, the entire surface of the glass sheet may be coated with the enamel coating, when such coating is used as a paint.

The deposition may be followed by a fixing step, allowing the glazing to be handled without damaging the enamel layer. The fixing step may comprise an optional drying step, so as to remove any solvent and organic content, optionally under heating at temperatures of from 80 to 160° C., or may comprise a UV curing step when the medium is UV-crosslinkable.

The firing step (3) is typically applied to adhere the enamel to the surface of the glass sheet, at a temperature of from 500-680° C., to form a fired enamel coating. The firing temperature may alternatively range of from 540 to 640° C., alternatively of from 540 to 615° C., alternatively of from 550 to 600° C. The firing step (3) may have a duration of from 120 to 600 seconds. The firing step (3) taking place at temperatures ranging of from 540 to 615° C., alternatively of from 550 to 600° C., allows for a satisfactory firing of the enamel coating while not inducing the formation of $Bi_4Si_3O_{12}$ in too high amounts.

The fired enamel coating may have a thickness ranging of from 0.5 to 35 μm, alternatively of from 1 to 30 μm, alternatively of from 5 to 20 μm, for the "dry" enamel coating, adhered to the glass.

The fired enamel coating may exhibit a gloss value >10. Gloss, or surface reflectance, may be measured as specular reflectance off a surface compared to a base line reflection level, at an angle of 60°, as commonly used standard in the industry. Typical gloss meters may be used, in particular a Glossgard® glossmeter, from Gardner Laboratory or a Multigloss 268 glossmeter from Minolta. The gloss measurements may provide for an indication of surface smoothness in terms of gloss units, as outlined at least in U.S. Pat. No. 5,414,240.

Without wishing to be bound by theory, it is considered that a gloss value of >10 may be indicative of a surface of adequate smoothness to allow for stability of the multilayer coating applied subsequently, upon heat treatment. Such gloss value may be achieved upon firing at the temperatures indicated, with a particularly smooth layer of enamel obtained at firing temperatures ranging of from 540 to 600° C., alternatively of from 550 to 600° C.

The deposition step of the multilayer coating on the fired enamel coating is subsequent to the enamel deposition step, to form a coated glass sheet. Typical deposition methods of multilayer coatings and blocker layers include CVD, PECVD, PVD, magnetron sputtering, wet coating, etc. Different layers of the multilayer coating may be deposited using different techniques.

The multilayer coating is deposited on at least a part of the first surface of the glass sheet, and on at least a part of the fired enamel coating on the glazing to form a coated glass sheet. The multilayer coating is deposited on and in direct contact with the enamel coating.

The multilayer coating may be deposited on the entire first surface of the glass sheet, surface including the area free of enamel coating, and the area where the enamel coating is already deposited. In the scope of the present invention, the multilayer coating may be applied only on a portion of the first surface of the enamel coating, and not covering the entire surface of the enamel coated glass surface. Typically, a border of enamel coated glass surface may be free of multilayer coating. The border of enamel coated glass surface free of multilayer coating may compose of from 0.5 to 30% of the surface covered by the enamel coating. Such a border zone free of multilayer coating may prevent said coating to be damaged or corroded upon cutting and placing of the enameled glazing in its end application.

The multilayer coating may be the same over the entire portion of the glass substrate, or may be divided in sections. That is, the surface or the glass substrate may be divided in sections, receiving either the multilayer coating or remaining free or multilayer coating.

The multilayer coating may have electrical conductive properties or may not have electrical conductive properties. When the multilayer coating has conductive properties, the multilayer coating comprises at least one functional layer having electrical conductive properties, which may be a metal (metallic functional layer) or a conductive oxide layer (doped metal oxide). The present invention finds particular usefulness when the multilayer coating has electrical conductive properties.

When the multilayer coating does not have electrical conductive properties, it may be a multilayer coating free of functional layer, or free of transparent conductive oxide. Such multilayer coating include those coatings having layers of materials having alternating refractive indices. Such coatings are typically represented with a coating comprising a first layer of material having a low or high refractive index, a second layer of material having a high or low refractive index, a third layer of material having a low or high refractive index, a fourth layer of material having a high or low refractive index, and optional protective layer.

When the multilayer coating may have electrical conductive properties, it may be a coating comprising n functional layers and n+1 dielectric layers, wherein each functional layer is surrounded by dielectric layers. In such multilayer coating, the functional layer may also be known as an infrared reflecting layer or metallic functional layer. Such a multilayer coating having infrared reflective properties may serve as a solar control coating, a conductive coating, a low emissivity coating.

The functional layer may not necessarily be used as conductive layer, that is, the conductivity of the final multilayer coating may be or may not be required in the end application. For example, in architectural applications, the multilayer coating may mainly serve solar control properties or heat radiation control properties, while in automobile applications, the multilayer coating may be either useful as solar control coating, but may also be useful as conductive coating for a heatable windshield.

The metal or metallic functional layer or infrared reflecting layer may be made of silver, gold, palladium, platinum or alloys thereof. The functional layer may have a thickness of from 2 to 22 nm, alternatively of from 5 to 20 nm, alternatively of from 8 to 18 nm. The thickness range of the functional layer will influence the conductivity, the emissivity, the anti-solar function and the light transmission of the multilayer coating.

The dielectric layers may typically comprise oxides, nitrides, oxynitrides or oxycarbides of Zn, Sn, Ti, Zr, In, Al, Bi, Ta, Mg, Nb, Y, Ga, Sb, Mg, Si and mixtures thereof. These materials may be eventually doped, where examples of dopants include aluminium, zirconium, or mixtures thereof. The dopant or mixture of dopants may be present in an amount up to 15 wt %. Typical examples of dielectric materials include, but are not limited to, silicon based oxides, silicon based nitrides, zinc oxides, tin oxides, mixed zinc-tin oxides, silicon nitrides, silicon oxynitrides, titanium oxides, aluminum oxides, zirconium oxides, niobium oxides, aluminum nitrides, bismuth oxides, mixed silicon-zirconium nitrides, and mixtures of at least two thereof, such as for example titanium-zirconium oxide.

The coating may comprise a seed layer underneath at least one functional layer, and/or the coating may comprise a barrier layer on at least one functional layer. A given functional layer may be provided with either a seed layer, or a barrier layer or both. A first functional layer may be provided with either one or both of seed and barrier layers, and a second functional layer may be provided with either one or both of seed and barrier layers and further so. These constructions are not mutually exclusive. The seed and/or barrier layers may have a thickness of from 0.1 to 35 nm, alternatively 0.5 to 25 nm, alternatively 0.5 to 15 nm, alternatively 0.5 to 10 nm.

The coating may also comprise a thin layer of sacrificial material having a thickness <15 nm, alternatively <9 nm, provided above and in contact with at least one functional layer, and which may be selected from the group comprising titanium, zinc, nickel, chrome and mixtures thereof.

The coating may optionally comprise a topcoat or top layer, as last layer, intended to protect the stack below it, from damage. Such top coat include oxides of Ti, Zr, Si, Al, or mixtures thereof; nitrides of Si, Al, or mixtures thereof; carbon-based layers (such as graphite or diamond-like carbon).

Further examples of multilayer coating include a low emissivity coating comprising at least one silver layer, and a sequence : substrate/MeO/ZnO:AlSi/Ag/AlSi-MeO where MeO is a metallic oxide such as $SnO_2$, $TiO_2$, $In_2O_3$, $Bi_2O_3$, $ZrO_2$, $Ta_2O_5$, $SiO_2$ or $Al_2O_3$ or a mixture thereof.

Further examples of multilayer coating include those coatings comprising:
  an infrared (IR) reflecting layer contacting and sandwiched between first and second layers, said second layer comprising NiCrOx; and
  wherein at least said second layer comprising NiCrOx is oxidation graded so that a first portion of said second layer close to said infrared (IR) reflecting layer is less oxidized than a second portion of said second layer that is further from said infrared (IR) reflecting layer.

Examples of multilayer coating also include those coatings comprising: a dielectric layer; a first layer comprising zinc oxide located over the dielectric layer; an infrared (IR) reflecting layer comprising silver located over and contacting the first layer comprising zinc oxide; a layer comprising an oxide of NiCr located over and contacting the IR reflecting layer; a second layer comprising zinc oxide located over and contacting the layer comprising the oxide of NiCr; and another dielectric layer located over the second layer comprising zinc oxide;
  or those comprising: a first dielectric layer; a first infrared (IR) reflecting layer comprising silver located over at least the first dielectric layer; a first layer comprising zinc oxide located over at least the first IR reflecting layer and the first dielectric layer; a second IR reflecting layer comprising silver located over and contacting the first layer comprising zinc oxide; a layer comprising an oxide of NiCr located over and contacting the second IR reflecting layer; a second layer comprising zinc oxide located over and contacting the layer comprising the oxide of NiCr; and another dielectric layer located over at least the second layer; comprising zinc oxide.

Further suitable examples of multilayer coating include a solar control coating comprising

- a base dielectric layer comprising at least a base dielectric lower layer and a base dielectric upper layer which is of a different composition to that of the base dielectric lower layer, the base dielectric upper layer comprising either one of zinc oxide or a mixed oxide of Zn and at least one additional material X, in which the ratio X/Zn in the base dielectric upper layer is between 0.02 and 0.5 by weight and in which X is one or more of the materials selected from the group comprising Sn, Al, Ga, In, Zr, Sb, Bi, Mg, Nb, Ta and Ti,
- a first infra-red reflecting layer, such as silver, gold, platinum, or mixtures thereof,
- a first barrier layer,
- a central dielectric layer comprising at least a central dielectric lower layer and a central dielectric upper layer which is of a different composition to that of the central dielectric lower layer, the central dielectric lower layer being in direct contact with the first barrier layer and the central dielectric upper layer; the central dielectric upper layer comprising either one of zinc oxide or a mixed oxide of Zn and at least one additional material Y, in which the ratio Y/Zn in the base dielectric upper layer is between 0.02 and 0.5 by weight and in which Y is one or more of the materials selected from the group comprising Sn, Al, Ga, In, Zr, Sb, Bi, Mg, Nb, Ta and Ti,
- a second infra-red reflecting layer, such as silver, gold, platinum, or mixtures thereof,
- a second barrier layer,
- a top dielectric layer.

A still further example of suitable multilayer coating includes a solar control coating comprising

- a base dielectric layer comprising at least a base dielectric lower layer and a base dielectric upper layer which is of a different composition to that of the base dielectric lower layer, the base dielectric upper layer comprising either one of zinc oxide or a mixed oxide of Zn and at least one additional material X, in which the ratio X/Zn in the base dielectric upper layer is between 0.02 and 0.5 by weight and in which X is one or more of the materials selected from the group comprising Sn, Al, Ga, In, Zr, Sb, Bi, Mg, Nb, Ta and Ti,
- a first infra-red reflecting layer, such as silver, gold, platinum, or mixtures thereof,
- a first barrier layer,
- a second dielectric layer comprising at least a second dielectric lower layer and a second dielectric upper layer which is of a different composition to that of the second dielectric lower layer, the second dielectric lower layer being in direct contact with the first barrier layer and the second dielectric upper layer; the second dielectric upper layer comprising either one of zinc oxide or a mixed oxide of Zn and at least one additional material Y, in which the ratio Y/Zn in the second dielectric upper layer is between 0.02 and 0.5 by weight and in which Y is one or more of the materials selected from the group comprising Sn, Al, Ga, In, Zr, Sb, Bi, Mg, Nb, Ta and Ti,
- a second infra-red reflecting layer, such as silver, gold, platinum, or mixtures thereof,
- a second barrier layer,
- a third dielectric layer comprising at least a third dielectric lower layer and a third dielectric upper layer which is of a different composition to that of the third dielectric lower layer, the third dielectric lower layer being in direct contact with the second barrier layer and the third dielectric upper layer; the third dielectric upper layer comprising either one of zinc oxide or a mixed oxide of Zn and at least one additional material Y, in which the ratio Y/Zn in the third dielectric upper layer is between 0.02 and 0.5 by weight and in which Y is one or more of the materials selected from the group comprising Sn, Al, Ga, In, Zr, Sb, Bi, Mg, Nb, Ta and Ti,
- a third infra-red reflecting layer, such as silver, gold, platinum, or mixtures thereof,
- a third barrier layer,
- a top dielectric layer.

In such stacks, the base dielectric upper layer may be in direct contact with the first infra-red reflecting layer. The central dielectric upper layer may be in direct contact with the second infra-red reflecting layer. The upper layers of both the base dielectric layer and the central, first and second dielectric layer may independently have a geometrical thickness within the range of about 3 to 20 nm. One or both of the additional materials X and Y may be Sn and/or Al. The proportion of Zn in the mixed oxide that forms the base dielectric upper layer and/or that which forms the central dielectric upper layer may be such that ratio X/Zn and/or the ratio Y/Zn is between about 0.03 and 0.3 by weight. The first and/or second and/or third barrier layer may be a layer comprising Ti and/or comprising an oxide of Ti, and they may each independently have a geometrical thickness of from 0.5 to 7 nm. The base dielectric upper layer and/or the central and/or the second and/or third dielectric upper layer may independently have a geometrical thickness <20 nm, alternatively <15 nm, alternatively <13 nm, alternatively <11 nm, and >3 nm, alternatively >5 nm, alternatively >10 nm. The infra-red reflecting layers may each independently have a thickness of from 2 to 22 nm, alternatively of from 5 to 20 nm, alternatively of from 8 to 18 nm. The top dielectric layer may comprise at least one layer which comprises a mixed oxide of Zn and at least one additional material W, in which the ratio W/Zn in that layer is between 0.02 and 2.0 by weight and in which W is one or more of the materials selected from the group comprising Sn, Al, Ga, In, Zr, Sb, Bi, Mg, Nb, Ta and Ti.

A specific example of such a solar control coating is provided in the table below, in which ZnSnOx is a mixed oxide containing Zn and Sn deposited by reactively sputtering a target which is an alloy or mixture of Zn and Sn, in the presence of oxygen. Alternatively, a mixed oxide layer may be formed by sputtering a target which is a mixture of zinc oxide and an oxide of an additional material, particularly in an argon gas or argon rich oxygen containing atmosphere.

The Ti barriers are deposited by sputtering a Ti target which is in an argon rich oxygen containing atmosphere to deposit a barrier that is not fully oxidized. The oxidation state in each of the base, central and top ZnSnOx dielectric layers need not necessarily be the same. Similarly, the oxidation state in each of the Ti barriers need not be the same. Each overlying barrier protects its underlying silver layer from oxidation during sputter deposition of its overlying ZnSnOx oxide layer. Whilst further oxidation of these barriers layers may occur during deposition of their overlying oxide layers a portion of these barriers may remain in metallic form or in the form of an oxide that is not fully oxidized to provide a barrier for and during subsequent heat treatment of the glazing panel.

| (ratio of Sn/Zn by weight) | Geometrical thickness |
|---|---|
| Glass substrate | 2 mm |
| Base dielectric layer comprising: | |
| lower layer of ZnSnOx (0.7) | 20 nm |
| upper layer of ZnSnOx (0.17) | 10 nm |
| Ag | 10 nm |
| Ti overlying barrier | 4 nm |
| Central dielectric layer comprising | |
| central lower layer of ZnSnOx (0.7) | 65 nm |
| upper layer of ZnSnOx (0.17) | 10 nm |
| Ag | 10 nm |
| Ti overlying barrier | 4 nm |
| Top dielectric layer comprising: | |
| lower layer of ZnSnOx (0.17) | 8 nm |
| upper layer of ZnSnOx (0.7) | 14 nm |
| Protective overcoat of Ti | 3 nm |

An optimal solar control coating according to the invention may comprise the following sequential layers:
 a base dielectric layer comprising a base dielectric lower layer and a base dielectric upper layer which is of a different composition to that of the base dielectric lower layer,
 the base dielectric lower layer comprising a mixed oxide of Zn and Sn having a ratio Sn/Zn ranging from 0.5 to 2 by weight
 the base dielectric upper layer comprising a mixed oxide of Zn and Sn having a ratio Sn/Zn ranging from 0.02 to 0.5 by weight
 a first infra-red reflecting layer comprising metallic silver
 a first barrier layer
 a central dielectric layer comprising a central dielectric lower layer and a central dielectric upper layer which is of a different composition to that of the central dielectric lower layer being in direct contact with the first barrier layer and comprising a mixed oxide of Zn and Sn having a ratio Sn/Zn ranging from 0.5 to 2
 the central dielectric upper layer comprising a mixed oxide of Zn and Sn having a ratio Sn/Zn ranging from 0.02 to 0.5 by weight
 second infra-red reflecting layer comprising metallic silver
 second barrier layer
 top dielectric layer.

Such optimal solar control coating suitable to the present invention may comprise the following sequential layers and geometrical thicknesses:
 a base dielectric layer comprising a base dielectric lower layer and a base dielectric upper layer which is of a different composition to that of the base dielectric lower layer,
 the base dielectric lower layer comprising a mixed oxide of Zn and Sn having a ratio Sn/Zn ranging from 0.5 to 2 by weight, having a geometrical thickness of from 15-25 nm,
 the base dielectric upper layer comprising a mixed oxide of Zn and Sn having a ratio Sn/Zn ranging from 0.02 to 0.5 by weight, having a geometrical thickness of from 5-15 nm,
 a first infra-red reflecting layer comprising metallic silver, having a geometrical thickness of from 8-16 nm,
 a first barrier layer, having a geometrical thickness of from 3-8 nm,
 a central dielectric layer comprising a central dielectric lower layer and a central dielectric upper layer which is of a different composition to that of the central dielectric lower layer being in direct contact with the first barrier layer and comprising a mixed oxide of Zn and Sn having a ratio Sn/Zn ranging from 0.5 to 2, having a geometrical thickness of from 58-74 nm,
 the central dielectric upper layer comprising a mixed oxide of Zn and Sn having a ratio Sn/Zn ranging from 0.02 to 0.5 by weight, having a geometrical thickness of from 5-15 nm,
 a second infra-red reflecting layer comprising metallic silver, having a geometrical thickness of from 8-16 nm,
 a second barrier layer, having a geometrical thickness of from 3-8 nm,
 a top dielectric layer, having a geometrical thickness of from 14-22 nm,
 an optional topcoat having a geometrical thickness of from 2-8 nm.

A further optimal solar control coating according to the invention may comprise the following sequential layers:
 a base dielectric layer comprising a base dielectric lower layer and a base dielectric upper layer which is of a different composition to that of the base dielectric lower layer,
 the base dielectric lower layer comprising a mixed oxide of Zn and Sn having a ratio Sn/Zn ranging from 0.5 to 2 by weight
 the base dielectric upper layer comprising a mixed oxide of Zn and Sn having a ratio Sn/Zn ranging from 0.02 to 0.5 by weight
 a first infra-red reflecting layer comprising metallic silver
 a first barrier layer
 a second dielectric layer comprising a second dielectric lower layer and a second dielectric upper layer which is of a different composition to that of the second dielectric lower layer being in direct contact with the first barrier layer and comprising a mixed oxide of Zn and Sn having a ratio Sn/Zn ranging from 0.5 to 2
 the second dielectric upper layer comprising a mixed oxide of Zn and Sn having a ratio Sn/Zn ranging from 0.02 to 0.5 by weight
 a second infra-red reflecting layer comprising metallic silver
 a second barrier layer
 a third dielectric layer comprising a third dielectric lower layer and a third dielectric upper layer which is of a different composition to that of the third dielectric lower layer being in direct contact with the second barrier layer and comprising a mixed oxide of Zn and Sn having a ratio Sn/Zn ranging from 0.5 to 2
 the third dielectric upper layer comprising a mixed oxide of Zn and Sn having a ratio Sn/Zn ranging from 0.02 to 0.5 by weight
 a third infra-red reflecting layer comprising metallic silver
 a third barrier layer
 a top dielectric layer.

Such further optimal solar control coating suitable to the present invention may comprise the following sequential layers and geometrical thicknesses:
- a base dielectric layer comprising a base dielectric lower layer and a base dielectric upper layer which is of a different composition to that of the base dielectric lower layer,
- the base dielectric lower layer comprising a mixed oxide of Zn and Sn having a ratio Sn/Zn ranging from 0.5 to 2 by weight, having a geometrical thickness of from 25-35 nm,
- the base dielectric upper layer comprising a mixed oxide of Zn and Sn having a ratio Sn/Zn ranging from 0.02 to 0.5 by weight, having a geometrical thickness of from 5-15 nm,
- a first infra-red reflecting layer comprising metallic silver, having a geometrical thickness of from 10-16 nm,
- a first barrier layer, having a geometrical thickness of from 3-8 nm,
- a second dielectric layer comprising a second dielectric lower layer and a second dielectric upper layer which is of a different composition to that of the second dielectric lower layer being in direct contact with the first barrier layer and comprising a mixed oxide of Zn and Sn having a ratio Sn/Zn ranging from 0.5 to 2, having a geometrical thickness of from 58-74 nm,
- the second dielectric upper layer comprising a mixed oxide of Zn and Sn having a ratio Sn/Zn ranging from 0.02 to 0.5 by weight, having a geometrical thickness of from 5-15 nm,
- a second infra-red reflecting layer comprising metallic silver, having a geometrical thickness of from 10-17 nm,
- a second barrier layer, having a geometrical thickness of from 3-8 nm,
- a third dielectric layer comprising a third dielectric lower layer and a third dielectric upper layer which is of a different composition to that of the third dielectric lower layer being in direct contact with the second barrier layer and comprising a mixed oxide of Zn and Sn having a ratio Sn/Zn ranging from 0.5 to 2, having a geometrical thickness of from 50-75 nm,
- the third dielectric upper layer comprising a mixed oxide of Zn and Sn having a ratio Sn/Zn ranging from 0.02 to 0.5 by weight, having a geometrical thickness of from 5-15 nm,
- a third infra-red reflecting layer comprising metallic silver, having a geometrical thickness of from 10-16 nm,
- a third barrier layer, having a geometrical thickness of from 3-8 nm,
- a top dielectric layer, having a geometrical thickness of from 20-40 nm,
- an optional topcoat having a geometrical thickness of from 2-8 nm.

Multilayer coatings comprising at least one layer of conductive oxide include these conductive oxides to provide for benefits such as solar protection, light transmission, electrical conductivity, low-emissivity. Examples of metal oxide include at least one of indium oxide, zinc oxide, or a mixture thereof, optionally doped with fluorine, antimony, aluminium, gallium or hafnium.

Such multilayer coatings may include materials of higher or lower refractive indices (n) in alternating sequence. For example a multilayer coating may have a layer of material having n<1.8, a layer of material with n>1.8, a layer of material with n<1.8, and a conductive layer below or above the layer of material with n>1.8. Another example of a multilayer coating may have a layer of material having n>1.8, a layer of material with n<1.8, a second layer of material with n<1.8, and a conductive layer between the layers of material with n<1.8. Examples of transparent conductive oxides include $SnO_2$:F, $SnO_2$:Sb or ITO (indium tin oxide), ZnO:Al, ZnO:Ga, ZnO:Hf.

The coated glass sheet is subsequently thermally treated at step (5) at a temperature of from 550 to 700° C. of the method, alternatively of from 570 to 680° C., alternatively of from 570 to 670° C., alternatively of from 600 to 670° C., to form an enameled glazing.

The thermal treatments comprise heating, and optionally bending, the coated glass sheet to a temperature of from 550 to 700° C. in air, in particular of from 570° C. to 680° C., or of from 570 to 670° C., alternatively of from 600 to 670° C., during around 1, 3, 4, 6, 8, 10, 12 or even 15 minutes according to the heat-treatment type and the thickness of the glass sheet, to form an enameled glazing.

Typically, the thermal treatment of step (5) includes the bending of the coated glass sheet, either as a single sheet or in a double sheet process.

The thermal treatment of step (5) taking place at temperatures ranging of from 570 to 670° C., alternatively of from 600 to 670° C., allows for a satisfactory firing of the enamel coating while not inducing the formation of $Bi_4Si_3O_{12}$ in too high amounts.

In some instances, it may be advantageous that the firing step (3) would take place at temperatures ranging of from 540 to 615° C., alternatively of from 550 to 600° C., and the thermal treatment of step (5) taking place at temperatures ranging of from 570 to 670° C., alternatively of from 600 to 670° C. In some instances it may be particularly advantageous that the firing step (3) would take place at temperatures ranging of from 540 to 615° C., alternatively of from 550 to 600° C., and the thermal treatment of step (5) taking place at temperatures ranging of from 600 to 670° C. In such instances, where the firing temperature range of step (3) is lower than or in the lower range of the thermal treatment temperature range of step (5), the enamel coating obtained from the firing step (3) is smooth, allowing for an optimal formation of the multilayer coating and the enamel coating further remains smooth during the thermal treatment of step (5).

The thermal treatments of step (5) of the present method may comprise a rapid cooling step after the heating step, to introduce a stress difference between the surfaces and the core of the glass so that in case of impact, the so-called tempered glass sheet will break safely in small pieces. If the cooling step is less strong, the glass will then simply be heat-strengthened and in any case offer a better mechanical resistance.

Further heat treatment may be implied in process steps like 1) bending in single or two sheets, typically when the bending did not occur during step (5), 2) tempering, 3) sintering of colored ceramic print or silver bus bar print, 4) vacuum sealing of vacuum double glazing and 5) calcination of a wet-coated low reflective coating or antiglare coating.

The enameled glazing may be subjected to a toughening or bending type of heat treatment. In some case, it may indeed be useful to mechanically reinforce the enameled glazing by a thermal treatment of the glass sheet to improve its resistance to mechanical constraints. It can also be necessary to bend the enameled glazing at high temperature for specific applications.

The present process may include further optional steps of washing, cutting and sizing, which are well known by the skilled in the art, and will not be detailed herein.

The present process does not require enamel removal, although this may be carried out if circumstances require so. In the scope of the present invention, no enamel removal is required. This has the advantage that no specific additional design step is necessary.

The present process requires two subsequent heating steps, with the firing step (3) taking place before the multilayer coating is deposited. This has the advantage that the multilayer coating does not require an additional enamel-contact layer which may impact the optical properties of said multilayer coating.

The distinct steps of firing and subsequent thermal treatment optionally including bending allows for the multilayer coating to be preserved from any damage due to the firing of the enamel coating during step (3).

The enamel coating in the enameled glazing obtained from the present method may comprise $Bi_4Si_3O_{12}$ which has been generated during the firing of step (3) and/or the thermal treatment of step (5). In some instances, the firing of step (3) and the thermal treatment of step (5) of the process described here do not generate $Bi_4Si_3O_{12}$.

The enamel coating in the enameled glazing provided by the present method exhibits a crystallinity ratio <5, wherein the crystallinity ratio is the ratio of $Bi_4Si_3O_{12}/Cr_2CuO_4$, as measured by XRD. The crystallinity ratio is measured on an enamel coating free of multilayer coating. The crystallinity ratio is measured by XRD after the enamel coating in the enameled glazing has undergone both the first firing of step (3) and the thermal treatment of step (5), in the procedure described hereabove. The enameled glazing may alternatively exhibit a crystallinity ratio <2, alternatively <1, alternatively <0.05, alternatively <0.01, as measured by XRD. In some instances, where the firing of step (3) and the thermal treatment of step (5) of the process described here do not generate $Bi_4Si_3O_{12}$ and the initial enamel composition does not contain $Bi_4Si_3O_{12}$, the crystallinity ratio is =0.

X-ray powder diffraction (XRD) is an analytical technique typically used for phase identification of a crystalline material. This test method is performed by directing an x-ray beam at a sample and measuring the scattered intensity as a function of the outgoing direction. Once the beam is separated, the scatter, also called a diffraction pattern, indicates the sample's crystalline structure. A refinement technique is then used to characterize the crystal structure which most likely provided the observed pattern. For typical powder patterns, data is collected at 2θ from ~5° to 70°, angles that are preset in the X-ray scan.

First, the enamel coating is removed from the glass sheet after the first firing of step (3) and the thermal treatment of step (5). Said removed enamel coating is ground and homogenized, and submitted to the XRD analysis.

In a separate analysis, XRF may be used to further determine the average bulk composition of the enamel coating. Further analysis of the bulk compositions may include scanning electron microscopy (SEM), or electron probe micro-analysis (EPMA), among others.

The XRD scan generated will comprise both an amorphous component and a crystalline component. The mathematical removal of the amorphous components are removed from the scan, to only consider the crystalline components.

The XRD method used herein takes benefit of the International Center for Diffraction Data (ICDD card) to identify the crystals and material of the enamel coating. In such manner, the respective areas of the peak shape (area and height) and positions at specific angles of 2θ are extracted accounting for each of the $Bi_4Si_3O_{12}$ and the $Cr_2CuO_4$ and the ratio $Bi_4Si_3O_{12}/Cr_2CuO_4$ is calculated.

The present invention thus provides for an enameled glazing comprising at least a glass sheet, a multilayer coating, and an enamel coating, wherein, in presence of $Bi_4Si_3O_{12}$, the enamel coating exhibits a crystallinity ratio <5, wherein the crystallinity ratio is the ratio of $Bi_4Si_3O_{12}/Cr_2CuO_4$, as measured by XRD.

The present invention thus also provides for an enameled glazing comprising at least a glass sheet, a multilayer coating, and an enamel coating, wherein the enamel coating is free of $Bi_4Si_3O_{12}$.

The second surface of the enameled glazing may be coated with further coatings, as required by the final use of said enameled glazing.

That is, when the first surface of a first glass sheet is coated with the present enamel coating, and present multilayer coating, the second (and opposite) surface of the first glass sheet may be coated with further coatings.

A step of laminating the enameled glazing may be added subsequent to the heat treatment step of the present method.

The present invention provides for a laminated glazing comprising the present enameled glazing, a thermoplastic interlayer and a second glazing.

As customary used, the exterior surface of the external glass of a laminated glazing, facing the outside, is known as position P1, while the interior surface of the external glass, that is, the surface facing the first surface of the laminating film, is known as position P2. The interior surface of the internal glass of a laminated glazing, that is, the surface facing the second surface of the laminating film, is known as position P3, while the exterior surface of the internal glass, facing the inside of the vehicle (or inside the room), is known as position P4.

The enameled glazings may thus be bonded to a second glazing via at least one thermoplastic interlayer to form a composite pane. The thermoplastic interlayer typically contains thermoplastic materials, for example, polyvinyl butyral (PVB), ethylene vinyl acetate (EVA), polyurethane (PU), polyethylene terephthalate (PET), or multiple layers thereof, typically with a total thickness of from 0.3 to 0.9 mm.

The thermoplastic interlayer may contain colorants.

The enamel coating and the multilayer coating will typically be applied on the surface of a glazing facing the thermoplastic interlayer, that is, in positions P2 or P3, and may also be applied on the surface of the glass sheet facing the interior of the vehicle. In some instances, a further enamel coating may be applied on the surface of the glass sheet facing the interior of the vehicle, that is, position P4, for example for adhesion promotion of the vehicle window to the vehicle frame.

The second glazing may be a glass of soda-lime-silica, aluminosilicate or borosilicate type, and the like. Typically, the second glazing is float glass, having a thickness of from 1 to 8 mm. The composition of the glazing is not crucial for the purpose of the present invention. The glazing may be clear glass, ultra-clear glass or colored glass, comprising one or more component (s)/colorant(s) in an appropriate amount as a function of the effect desired. The second glazing may be of the same or a different glass composition from the first glazing used in the enameled glazing.

The second glazing may be coated on at least one of its surfaces, or on both surfaces, with the same or a different coating, as required by the final use of the laminated glazing provided herein. The second glazing may also be an enameled glazing per the present invention.

The present invention provides for the use of the present enameled glazing in transportation application or building applications.

The present invention provides for the use of the present enameled glazing as a vehicle glazing. Such vehicle glazing includes windshield, rear window, side windows, sun roof, panoramic roof or any other window useful in a vehicle. In some instances, the vehicle glazing may be a heatable vehicle glazing, or a non-heatable vehicle glazing.

In certain embodiments of the invention, the enameled glazing may be used as a heatable vehicle glazing.

The present invention provides for the use of the present laminated glazing comprising the present enameled glazing, a thermoplastic interlayer and a second glazing, as a heatable vehicle glazing, or a non-heatable vehicle glazing.

The laminated glazing may further comprise busbars and necessary means for providing for the electrical power supply required to heat the laminated glazing. The electrical supply will be adapted to the intended function of the laminated glazing.

The types of vehicles include those vehicles for transportation on road, in air, in and on water, in particular cars, busses, trains, ships, and other motor vehicles.

Other uses of the present enameled glazing include architectural applications, construction applications, as built-in component in furniture or devices, or any other applications where such an enameled glazing may be useful.

In certain embodiments of the invention, the enameled glazing may be used as a heatable window, such as in architectural applications.

The conditions that the enamel coating either comprises no $Bi_4Si_3O_{12}$ or, if it comprises $Bi_4Si_3O_{12}$, the enamel coating in the enameled glazing exhibits a crystallinity ratio <5, as measured by XRD, wherein the crystallinity ratio is the ratio of $Bi_4Si_3O_{12}/Cr_2CuO_4$., are indicative that the enamel coating will not be impaired and/or will not impair the multilayer coating applied thereon. Such absence of degradation is observed by an absence of discoloration of the enameled glazing throughout its entire surface, such as hot spots, color shift. That is, the area of the enameled glazing comprising both the enamel coating and the multilayer coating is homogenous throughout, and the area of the enameled glazing comprising only the enamel coating is also homogenous throughout. Such homogenous and inform aspect is a very attractive advantage from an aesthetic point of view.

When considering a conductive multilayer coating comprising n metal functional layers and n+1 dielectric layers, wherein each metal functional layer is sandwiched between two dielectric layers, and wherein the functional layer is a silver layer, a first advantage of the present enameled glazing may be to provide for a pleasing and aesthetic aspect of the glazing, when the multilayer coating is provided for a passive use of solar control.

When the multilayer coating is provided for an active use, having heating capability, degradation or deterioration of the multilayer coating, for example the silver layer, will impact sheet resistance, which will increase, and consequently, conductivity will decrease. Thus, a second advantage may be to allow for an optimal sheet resistance value of the coating. The quality of the silver layer in the multilayer coating being maintained, the current can circulate as required. Indeed, when the multilayer coating is fully functioning, sheet resistance values may range of from 0.75 to 3 ohm/square, depending on the number of conductive layers in the multilayer coating.

The present enameled glazing will have sheet resistance values which remain of from 0.75 to 3 ohm/square, alternatively of from 0.8 to 2.2 Ohm/square. Variation of the sheet resistance of the present enameled coating will remain in a range within 35% of the value of the sheet resistance of the multilayer coating on glass, in absence of an enamel coating, alternatively in a range within 30%, alternatively in a range within 25%, alternatively in a range within 15%. This indicates, that although the multilayer coating is applied on an enamel coating, its conductivity performance is maintained, and its active use ensured. This is particularly due to the fact that the enamel coating either comprises no $Bi_4Si_3O_{12}$ or, if it comprises $Bi_4Si_3O_{12}$, the enamel coating in the enameled glazing exhibits a crystallinity ratio <5, as measured by XRD, wherein the crystallinity ratio is the ratio of $Bi_4Si_3O_{12}/Cr_2CuO_4$.

Therefore, the present enameled glazing may have a sheet resistance value ranging of from 0.75 to 3 ohm/square, alternatively of from 0.8 to 2.2 Ohm/square, and may comprise an enamel coating which either comprises no $Bi_4Si_3O_{12}$ or, if it comprises $Bi_4Si_3O_{12}$, the enamel coating in the enameled glazing exhibits a crystallinity ratio <5, as measured by XRD, wherein the crystallinity ratio is the ratio of $Bi_4Si_3O_{12}/Cr_2CuO_4$.

The use of an enamel coating exhibiting a crystallinity ratio <5, wherein the crystallinity ratio is the ratio of $Bi_4Si_3O_{12}/Cr_2CuO_4$, as measured by XRD, in an enameled glazing per the above allows to limit the variation of the sheet resistance in a range within 35% of the value of the sheet resistance of the multilayer coating on glass, in absence of an enamel coating, alternatively in a range within 25%.

The use of an enamel coating exhibiting a crystallinity ratio <1, wherein the crystallinity ratio is the ratio of $Bi_4Si_3O_{12}/Cr_2CuO_4$, as measured by XRD, in an enameled glazing per the above allows to limit the variation of the sheet resistance in a range within 8% of the value of the sheet resistance of the multilayer coating on glass, in absence of an enamel coating.

The use of an enamel coating free of $Bi_4Si_3O_{12}$, as measured by XRD, in an enameled glazing per the above allows to limit the variation of the sheet resistance in a range within 5% of the value of the sheet resistance of the multilayer coating on glass, in absence of an enamel coating.

EXAMPLES

The XRD analysis is carried out using a Bruker D8 Advance, provided with Software Bruker EVA.

Sheet resistance measurement are conducted using inductive measurements using a Stratometer G, having no pins contacting the layers (Nagy Instruments, Germany).

An alternative method for sheet resistance measurement is the four-probe test method. Four sharp probes (usually with Zn coated tips) are placed on a flat surface of the material to be measured, current is passed through the two outer electrodes, and the floating potential if measured across the inner pair.

Examples 1, 2 and 3, and Comparative Example 1

The commercial enamel coatings 1, 2, 3 and 4 were applied on samples of 20×12 cm of clear float glass having a thickness of 2,1 mm, providing for enameled glazings, after a firing step at 590° C.

An example series of each type of enamel coated glazing 1, 2 and 3 was coated which a multilayer coating comprising 3 layers of silver and 4 dielectric layers comprising zinc oxide, each silver layer being sandwiched between two dielectric layers, was applied by PVD. After this coating operation, a thermal cycle was imposed to all samples, at a maximal temperature of 640° C., for 270 seconds, providing for Example 1 (Enamel 1), 2 (Enamel 2), and Comparative example 1 (Enamel 3), respectively.

An example series of enamel coated glazing 4 was coated which a multilayer coating comprising 2 layers of silver and 3 dielectric layers comprising zinc oxide, each silver layer being sandwiched between two dielectric layers, was applied by PVD. After this coating operation, a thermal cycle was imposed to all samples, at a maximal temperature of 640° C., for 270 seconds, providing for Example 3 (Enamel 4).

The quality of the Examples was already visually assessed after the last thermal cycle. Examples 1, 2 and 3 do show a homogenous and uniform color over their entire area. Comparative example 1 showed appearance of color inhomogeneities and color shift.

The sheet resistance was measured on the various samples and the average was calculated for each of the enamel types (2 samples per trial). The results are provided in Table 1.

Example 1 having a crystallinity ratio of 1.5, had a sheet resistance shift of 19.8%. Example 2 having a crystallinity ratio of 0.8, had a sheet resistance shift of 6.5%. Example 3, free of $Bi_4Si_3O_{12}$, had a sheet resistance shift of 2.6%. Comparative Example 1 having a crystallinity ratio of 7.1, had a sheet resistance shift of 79.1%.

TABLE 1

|  | Enamel type | Crystallinity ratio (XRD) | Coating sheet resistance on neat glass (Ohm/sq) | Coating sheet resistance on enameled glazing (Ohm/sq) | Sheet resistance shift (%) | Color |
|---|---|---|---|---|---|---|
| Example 1 | Commercial enamel 1 | 1.5 | 0.96 | 1.15 | 19.8 | ++ |
| Example 2 | Commercial enamel 2 | 0.8 | 0.92 | 0.98 | 6.5 | ++ |
| Example 3 | Commercial enamel 4 | 0 | 1.90 | 1.95 | 2.6 | ++ |
| Comparative Example C1 | Commercial enamel 3 | 7.1 | 0.86 | 1.54 | 79.1 | 0 |

The invention claimed is:

1. A method to provide for an enameled glazing comprising, in sequence:
   providing a glass sheet,
   depositing an enamel coating composition comprising at least bismuth oxide, silicon oxide, and $Cr_2CuO_4$, on at least a part of the glass sheet,
   firing the enamel coating on the glass sheet at a temperature of 500 to 680°, to form a fired enamel coating on the glass sheet,
   depositing a multilayer coating on the glass sheet and on at least a part of the fired enamel coating on the glass sheet to form a coated glass sheet,
   thermally treating the coated glass sheet at a temperature of 550 to 700° C., to form the enameled glazing comprising an enamel coating and a multilayer coating, wherein the enamel coating comprises $Bi_4Si_3O_{12}$ and the enamel coating exhibits a crystallinity ratio <5, as measured by XRD, wherein the crystallinity ratio is a ratio of $Bi_4Si_3O_{12}/Cr_2CuO_4$.

2. The method according to claim 1, wherein the firing temperature ranges from 550 to 600°.

3. The method according to claim 1, wherein the temperature of the thermal treatment ranges from 600 to 670° C.

4. The method according to claim 1, wherein the enamel coating exhibits a crystallinity ratio <2.

5. The method according to claim 1, wherein the enamel coating exhibits a crystallinity ratio <1.

6. The method according to claim 1, wherein the multilayer coating comprises at least one layer having electrical conductive properties.

7. The method according to claim 6, wherein the at least one layer having electrical conductive properties is selected from a metal or a doped metal oxide.

8. The method according to claim 7, wherein the metal oxide comprises at least one of indium oxide, zinc oxide, or a mixture thereof.

9. The method according to claim 6, wherein the metal comprises at least one of silver, gold, palladium, platinum, or a mixture thereof.

10. The method according to claim 6, wherein the multilayer coating comprises n metal functional layers and n+1 dielectric layers, wherein each metal functional layer is sandwiched between two dielectric layers.

11. The method according to claim 10, where n is 1 or more.

12. The method according to claim 10, wherein the multilayer coating comprises silver.

13. The method according to claim 1, wherein the multilayer coating comprises:
   a base dielectric layer comprising at least a base dielectric lower layer and a base dielectric upper layer which is of a different composition to that of the base dielectric lower layer, the base dielectric upper layer comprising either one of zinc oxide or a mixed oxide of Zn and at least one additional material X, in which a ratio X/Zn in the base dielectric upper layer is between 0.02 and 0.5 by weight and in which X is one or more of the materials selected from the group consisting of Sn, Al, Ga, In, Zr, Sb, Bi, Mg, Nb, Ta and Ti,
   a first infra-red reflecting layer, comprising silver, gold, platinum, or mixtures thereof,
   a first barrier layer,
   a central dielectric layer comprising at least a central dielectric lower layer and a central dielectric upper layer which is of a different composition to that of the central dielectric lower layer, the central dielectric lower layer being in direct contact with the first barrier layer and the central dielectric upper layer; the central dielectric upper layer comprising either one of zinc oxide or a mixed oxide of Zn and at least one additional material Y, in which a ratio Y/Zn in the base dielectric upper layer is between 0.02 and 0.5 by weight and in which Y is one or more of the materials selected from the group consisting of Sn, Al, Ga, In, Zr, Sb, Bi, Mg, Nb, Ta and Ti, a second infra-red reflecting layer, comprising silver, gold, platinum, or mixtures thereof, a second barrier layer, and a top dielectric layer.

14. The method according to claim 1, wherein the multilayer coating comprises:

a base dielectric layer comprising at least a base dielectric lower layer and a base dielectric upper layer which is of a different composition to that of the base dielectric lower layer, the base dielectric upper layer comprising either one of zinc oxide or a mixed oxide of Zn and at least one additional material X, in which a ratio X/Zn in the base dielectric upper layer is between 0.02 and 0.5 by weight and in which X is one or more of the materials selected from the group consisting of Sn, Al, Ga, In, Zr, Sb, Bi, Mg, Nb, Ta and Ti, a first infra-red reflecting layer, such as comprising silver, gold, platinum, or mixtures thereof, a first barrier layer, a second dielectric layer comprising at least a second dielectric lower layer and a second dielectric upper layer which is of a different composition to that of the second dielectric lower layer, the second dielectric lower layer being in direct contact with the first barrier layer and the second dielectric upper layer; the second dielectric upper layer comprising either one of zinc oxide or a mixed oxide of Zn and at least one additional material Y, in which a ratio Y/Zn in the second dielectric upper layer is between 0.02 and 0.5 by weight and in which Y is one or more of the materials selected from the group consisting of Sn, Al, Ga, In, Zr, Sb, Bi, Mg, Nb, Ta and Ti, a second infra-red reflecting layer comprising silver, gold, platinum, or mixtures thereof, a second barrier layer, a third dielectric layer comprising at least a third dielectric lower layer and a third dielectric upper layer which is of a different composition to that of the third dielectric lower layer, the third dielectric lower layer being in direct contact with the second barrier layer and the third dielectric upper layer; the third dielectric upper layer comprising either one of zinc oxide or a mixed oxide of Zn and at least one additional material Y, in which a ratio Y/Zn in the third dielectric upper layer is between 0.02 and 0.5 by weight and in which Y is one or more of the materials selected from the group consisting of Sn, Al, Ga, In, Zr, Sb, Bi, Mg, Nb, Ta and Ti, a third infra-red reflecting layer comprising silver, gold, platinum, or mixtures thereof, a third barrier layer, and a top dielectric layer.

15. The method according to claim 1, wherein the multilayer coating comprises a metal layer.

16. The method according to claim 1, wherein the multilayer coating is a conductive multilayer coating.

17. The method according to claim 1, wherein the enameled glazing has a sheet resistance ranging from 0.75 to 3 ohm/square after the thermally treating.

* * * * *